United States Patent
Gupta et al.

(10) Patent No.: US 10,977,681 B2
(45) Date of Patent: Apr. 13, 2021

(54) PERSONALIZED PRODUCT PRICING

(71) Applicant: Amazon Technologies, Inc., Reno, NV (US)

(72) Inventors: Gaurav Gupta, Jaipur (IN); Aman Bindal, New Delhi (IN); Vivek Chawda, San Luis Obispo, CA (US); Saket Saurabh, Haldwani (IN)

(73) Assignee: Amazon Technologies, Inc., Reno, NV (US)

( * ) Notice: Subject to any disclaimer, the term of this patent is extended or adjusted under 35 U.S.C. 154(b) by 977 days.

(21) Appl. No.: 14/176,900

(22) Filed: Feb. 10, 2014

(65) Prior Publication Data

US 2014/0236699 A1 Aug. 21, 2014

(30) Foreign Application Priority Data

Feb. 15, 2013 (IN) .............................. 444/DEL/2013

(51) Int. Cl.
 *G06Q 30/02* (2012.01)
(52) U.S. Cl.
 CPC .............................. *G06Q 30/0235* (2013.01)
(58) Field of Classification Search
 CPC ....................................................... G06Q 30/02
 USPC ............................................. 705/14.1–14.39
 See application file for complete search history.

(56) References Cited

U.S. PATENT DOCUMENTS

| | | | |
|---|---|---|---|
| 7,464,050 B1* | 12/2008 | Deaton | G06Q 20/20 705/14.1 |
| 9,226,042 B1* | 12/2015 | Kramer | H04N 21/812 |
| 2005/0267812 A1 | 12/2005 | Jensen et al. | |
| 2008/0052195 A1* | 2/2008 | Roth | G06Q 30/02 705/14.69 |
| 2009/0198563 A1 | 8/2009 | Tung et al. | |
| 2012/0173323 A1* | 7/2012 | Barlow | G06Q 30/0207 705/14.24 |
| 2012/0203615 A1* | 8/2012 | Mesaros | G06Q 10/08 705/14.25 |
| 2013/0103538 A1* | 4/2013 | Scholl | G06Q 30/0601 705/26.7 |
| 2013/0254010 A1* | 9/2013 | Letca | G06Q 30/0241 705/14.35 |
| 2014/0156420 A1* | 6/2014 | Chow | G06Q 30/02 705/14.71 |

OTHER PUBLICATIONS

Indian Patent Application 444/DEL/2013 filed on Feb. 15, 2013, First Examination Report dated Apr. 29, 2020.

* cited by examiner

*Primary Examiner* — Peter H Choi
*Assistant Examiner* — Derek Jessen
(74) *Attorney, Agent, or Firm* — Thomas | Horstemeyer LLP

(57) ABSTRACT

Disclosed are various embodiments for a pricing application. Customer interest in unpurchased items is determined by a browsing history of a customer. A notification is communicated to a merchant of the item soliciting an offer for the item to be communicated to the customer. The offer is then communicated to the customer for redemption.

21 Claims, 5 Drawing Sheets

PERSONALIZED PRODUCT PRICING

PRIORITY CLAIM AND INCORPORATION BY REFERENCE

This application claims priority to and the benefit of Indian Patent Application No. 444/DEL/2013, filed on Feb. 15, 2013, and incorporates by reference the contents of Indian Patent Application No. 444/DEL/2013 herein in its entirety.

BACKGROUND

Customers often browse for products they consider purchasing, but do not finalize a transaction for the product with a merchant. Merchants should incentivize the buyer to purchase the considered items.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Customer activity can indicate an interest in an item sold by a merchant. However, for various reasons, the customer may not complete a transaction to acquire the item. For example, the price for the particular item may be priced too high. A merchant may increase the conversion of items in which a customer is interested by being able to offer a customer a discount for a browsed item, thereby incentivizing the customer to acquire the item.

A pricing application detects when a customer has shown interest in an unpurchased item by analyzing browsing activity. Customer interest may be indicated by browsing to an item page in an electronic commerce system, adding the item to a shopping cart or wish list, discussing the item in a social media platform, or other activities. Once a customer has shown interest in an item, a notification is communicated to a merchant selling the item indicating the customer interest and soliciting an offer from the merchant to the customer for the item. The merchant may then communicate an offer for the item to the customer.

In the following discussion, a general description of the system and its components is provided, followed by a discussion of the operation of the same.

Figure 1:
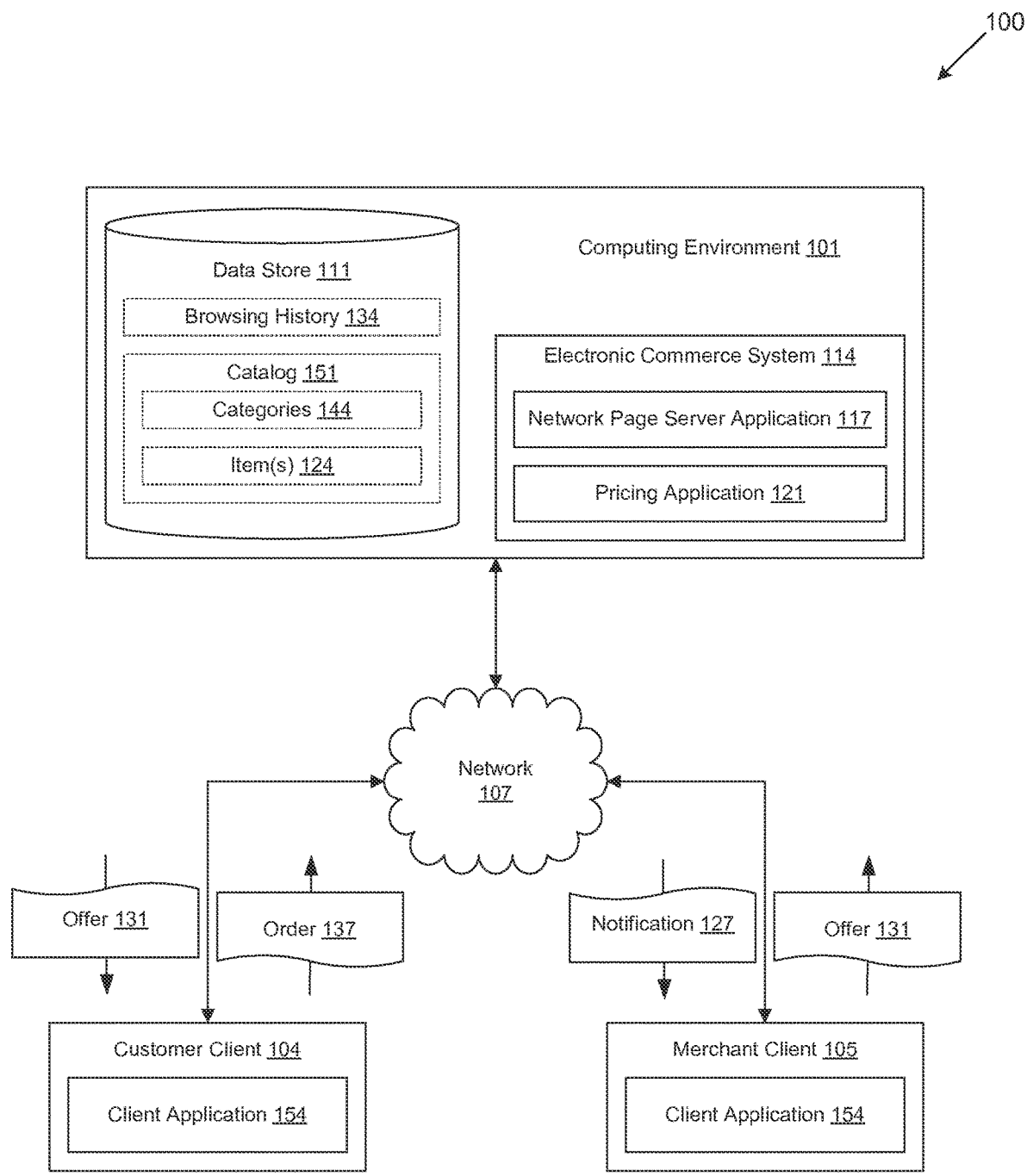
FIG. 1 is a drawing of a networked environment according to various embodiments of the present disclosure.

With reference to FIG. 1, shown is a networked environment 100 according to various embodiments. The networked environment 100 includes a computing environment 101, a customer client 104, and a merchant client 105, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include an electronic commerce system having 114 having a network page server application 117 and a pricing application 121, and other applications, services, processes, systems, engines, or functionality not discussed in detail herein.

The electronic commerce system 114 is executed in order to facilitate the online purchase of items 124 over the network 107. The electronic commerce system 114 also performs various backend functions associated with the online presence of a merchant in order to facilitate the online purchase of items 124 as will be described. For example, the electronic commerce system 114 generates network pages such as web pages or other types of network content that are provided to customer clients 104 for the purposes of selecting items for purchase, rental, download, lease, or other form of consumption as will be described. Such network pages may be served by a network page server application 117, or other functionality of the electronic commerce system 114.

The pricing application 121 determines if a customer client 104 has indicated interest in but not purchased an item 124. If such an item 124 exists with respect to a customer client 104, the pricing application 121 then communicates a notification 127 to a merchant client 105 selling the item 124 through the electronic commerce system 114 soliciting the merchant client 105 to extend an offer 131 to the customer client 104.

To this end, the pricing application 121 may determine if a customer client 104 has indicated interest in an item 124 analyzing browsing history 134 of the electronic commerce system 114 to determine if a trigger event has occurred. For example, a trigger event may comprise a customer client 104 browsing to a listing for the item 124 in the electronic commerce system 114. As another example, a trigger event may comprise the customer client 104 adding the item 124 to a shopping cart or wish list. Trigger events may also include the customer client 104 browsing reviews or ratings for the item 124, or discussing the item 124 in a forum, message board, or other service provided by the electronic commerce system 114.

In some embodiments, trigger events may be initiated in conjunction with customer client 104 activity with respect to other services whose activity is detectable by the pricing application 121. For example, the electronic commerce system 114 may implement functionality to discuss, share, "like," or otherwise promote an item 124 through a social networking application or through a social messaging service. In such an embodiment, the trigger event may comprise customer client 104 posting a social networking message encoding a navigation aid such as a hyperlink directed to the item 124, or other data associated with the item 124. Detection of such trigger events may be performed by monitoring service calls or application program interface calls executed in the computing environment 101, monitoring service calls or application program interface calls exposed by the electronic commerce system 114, or by another approach.

Trigger events may be detected with respect to a customer client 104 or detected with respect to a user account accessed by multiple customer clients 104. For example, a user of a mobile device customer client 104 may add an item 127 to a shopping cart of the electronic commerce system 114, and remove the item 127 from the shopping cart using a desktop computer customer client 104. As another example, a browsing of an item 127 by a first customer client 104 and a sharing of the item 127 on a social network by a second customer client 104 may both be weighted in determining interest by a user with respect to an item 127 if both the browsing and the sharing occur with respect to the same user account.

If a trigger event has occurred with respect to an item 124, thereby indicating a user of a customer client 104 has indicated interest in an item 124, the pricing application 121 must then determine if the customer client 104 has not purchased the item 124. This may comprise determining if a pending or completed order 137 exists with respect to the customer client 104 and the item 124. In some embodiments, if no such order exists 137, the pricing application 121 may then determine if a predefined amount of time has passed or if a predefined event has occurred in order to give the customer client 104 adequate time to purchase the item 124 before communicating a notification 127 to the merchant client 105.

In other embodiments, the pricing application may then determine if a predefined number of trigger events has occurred with respect to the item 124 without the item 124 being purchased. For example, the pricing application may determine if a user associated with a customer client 104 has viewed the item 124 a predefined number of times.

For example, in some embodiments, the pricing application 121 may determine if a set amount of time has passed since the trigger event, such as a defined number of hours or days. In other embodiments, the pricing application 121 may determine if a predefined event has occurred such as a termination of a session of the customer client 104 in the electronic commerce system 114, a subsequent removal of the item 124 from a wish list or shopping cart, or some other event. If the defined amount of time has passed or the predefined event has occurred, then the pricing application 121 considers the item 124 to have not been purchased by the customer client 104. Other criteria may also be used to determine if an item 124 has not been purchased by a customer client 104.

If the pricing application 121 has determined that a customer client 104 has indicated interest in an unpurchased item 124, the pricing application 121 communicates a notification 127 to a merchant client 105 selling the item 124 soliciting the merchant client 105 to extend an offer 131 to the customer client 104 for the item 124. In some embodiments, the pricing application 121 may determine if a customer client 104 has shown interest in an item 124 as a function of multiple trigger events after which the item 124 was not purchased. In such an embodiment, the pricing application 121 may communicate the notification 127 responsive to the item 124 satisfying a predefined number of trigger events. In other embodiments, the trigger events may be assigned scores or weights, and the pricing application 121 may communicate the notification 127 responsive to a score calculated as a function of the satisfied trigger events exceeding a threshold. The notification 127 may also be communicated to the merchant client 105 responsive to other events or criteria.

In some embodiments, a notification 127 may be sent to the merchant client 105 as a function of preferences or profiles defined by the merchant client 105. For example, merchant client 105 preferences may define a subset of items 124 sold by the merchant client 105 for which offers 131 may or will never be extended. Merchant client 105 preferences may also define a category 144 of items 124 for which offers 131 may or will never be extended. For example, a merchant client 105 may define preferences indicating that offers 131 will never be extended for items 124 in a camera category 144, but may be extended for items 124 in a camera bag category 144. Merchant client 105 preferences may also be used to send notifications 127 by other approaches.

The notification 127 comprises data indicating that a customer client 104 has shown interest in an item 124 but not purchased the item 124, and solicits the merchant client 105 to extend an offer 131 to the customer client 104 to purchase the item 124. In some embodiments, the notification 127 may also comprise data encoding a user interface to facilitate the generation of an offer 131 to be communicated by the merchant client 105 to the customer client 104.

The notification 127 may be communicated by a short messaging system (SMS) service, by email, or by another communications medium. In some embodiments, the notification 127 may be encoded in a network page served by the network page server application 117 to the merchant client 105. For example, the notification 127 may be encoded as a banner notification in a merchant dashboard encoded for rendering by the electronic commerce system 114, or another network page. The notification 127 may also be communicated by another approach.

An offer 131 may comprise a discount to be applied to the price of an item 124 when purchased by the customer client 104. The discount may comprise a predefined amount by which the price of the item 124 is reduced or a percentage of the item 124 price by which the price of the item 124 is reduced. The discount may also comprise other types of bargains or incentives with respect to the purchase of an item 124, such as a "buy one, get one free" offer, or another incentive.

In some embodiments, the pricing application 121 encodes into the notification 127 an automatically calculated suggested discount to be included in the offer 131. For example, the pricing application 121 may calculate the discount to be applied to an item 124 as a function of a minimum or maximum profit margin or a target revenue for the merchant client 105 with respect to a time period. The discount may also be calculated as a function of a known average, minimum, or maximum selling price for the item 124, or as a function of other data.

The discount of the offer 131 may be defined with respect to the item 124 or a category 144 of items 124. Additionally, the offer 131 may also comprise a duration during which the customer client 104 may initiate an order 147 for the item 124 and receive the benefit of the discount of the offer 131. Other data may also be included in the offer 131.

If the merchant client 105 extends the offer 131 to the customer client 104, the offer 131 is then communicated by the pricing application 121 to the customer client 104. The offer 131 may be communicated by SMS message, email message, push notification, encoded in a network page served by the network page server application 117, or by another approach. The customer client 104 may then choose to initiate an order 147 for the item 124 in the electronic commerce system 114, thereby receiving the benefit of the discount embodied in the offer 131.

In some embodiments, the pricing application 121 may expose an application program interface (API) to the merchant client 105 to facilitate the operations of the pricing application 121 described above. For example, the API may make accessible to the merchant client 105 a web service which initiates the determination of whether an item 124 available for purchase from the merchant client 105 has had interest shown in it by a customer client 104 who did not purchase the item 124. As another example, the API may make accessible web service which facilitates the merchant client 105 obtaining notifications. Additionally, the API may allow the merchant client 105 to access a web service to generate the offers 131 for communication to a customer client 104.

The API may also facilitate other operations of the merchant client 105 with respect to items 124 sold through the electronic commerce system 114, such as generating analytics with respect to orders 147 consummated with the merchant client 105. Such analytics may comprise conversion rates, browsing rates, profit margins, revenue, and other data.

The data stored in the data store 111 includes, for example, browsing history 134, and a catalog 151 of items 124 grouped into categories 144, and potentially other data. The browsing history 134 comprises data indicating the activity of customer clients 104 taken with respect to the electronic commerce system 114. The browsing history 134 may comprise data indicating the viewing of an item 124 page, the creation or viewing of item 124 reviews, viewing or posting message board or forum pages, adding items 124 to shopping carts or wish lists, or other activities. The catalog 151 encodes the items 124 available through the electronic commerce system 114 into a taxonomy. The taxonomy may group the items 124 into one or more categories 144 or other groupings. Items 124 comprise physical goods, digital content, services, or other products available for purchase, lease, rental, or obtaining through the electronic commerce system 114.

The customer client 104 and merchant client 105 are representative of a plurality of client devices that may be coupled to the network 107. The customer client 104 and merchant client 105 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The customer client 104 and merchant client 105 may be configured to execute various applications such as a client application 154 and/or other applications. The client application 154 may be executed in a customer client 104 and merchant client 105, for example, to access network content served up by the computing environment 101 and/or other servers. To this end, the client application 154 may comprise, for example, a browser, a dedicated application, etc. The customer client 104 and merchant client 105 may be configured to execute applications beyond the client application 154 such as, for example, email applications, social networking applications, word processors, spreadsheets, and/or other applications.

Next, a general description of the operation of the various components of the networked environment 100 is provided. To begin, a customer client 104 accesses the electronic commerce system 114 using a client application 154. The client application 154 may comprise a browser rendering network pages served by the network page server application 117, or a dedicated client application 154. As the customer client 104 interacts with the electronic commerce system 114, a browsing history 134 is generated with respect to the customer client 104 and items 124.

The pricing application 121 then accesses the browsing history 134 to determine if the customer client 104 has initiated a trigger event with respect to an item 124 indicating an interest in the item 124 by the customer client 104. A trigger event may comprise a customer client 104 browsing an item 124, adding an item 124 to a shopping cart or wish list, reading a review of an item 124, or other actions taken with respect to an item 124. The pricing application 121 may also access data associated with third party services integrated with the electronic commerce system 114 to determine if a trigger event has occurred with respect to an item 124. For example, the pricing application 121 may determine if a customer client 104 has discussed the item 124 in a social networking service or messaging service, or encoded a navigation aid linking to the item 124 in a social networking service or messaging service. The pricing application 121 may also determine if a trigger event has occurred with respect to an item by another approach.

If a trigger event has occurred with respect to an item 124 and a customer client 104, the pricing application 121 then determines if the customer client 104 has not purchased the item 124. This may comprise determining if no order 147 for the item 124 was created within a predefined time interval after the corresponding trigger event, or before a predefined event. The predefined event may include a removal of an item 124 from a shopping cart or wish list, a termination of a session of the customer client 104 with the electronic commerce system 114, or another event.

In some embodiments in which the pricing application 121 considers multiple trigger events, the pricing application 121 may determine if a customer client 104 is interested in an item 124 if a predefined number of trigger events have occurred without a subsequent purchase of the item 124, or if a score calculated as a function of a number of satisfied trigger events meets a threshold. The pricing application 121 may determine if a customer client 104 is interested in an item 124 by another approach.

If the pricing application 121 determines that a customer client 104 is interested in an unpurchased item 124, the pricing application 121 then sends a notification 127 to a merchant client 105 selling the item 124, soliciting the merchant client 105 to extend an offer 131 to the customer client 104 for the item 124. In some embodiments, the notification 127 comprises a suggested discount to be applied to the item 124 calculated as a function of a profit margin, revenue goal, or other data. In other embodiments, the notification 127 may comprise a user interface to facilitate the creation of an offer 131 by the merchant client 105. The notification 127 may also comprise other data.

The notification 127 may be communicated by SMS message, email, push notification, or another communications medium. The notification 127 may also be encoded in a network page served by the network page server application 117, or otherwise encoded as data for rendering by a client application 154 executed by the merchant client 105. The notification 127 may also be communicated by another approach.

After receiving the notification 127, the merchant client 105 may generate an offer 131 for the item 124 to be communicated to the customer client 104. The offer 131 may comprise a discount applied to the price of the item 124. The discount may be defined with respect to a specific item 124, a subset of items 124, or a category 144 of items 124. The offer 131 may also comprise a time interval during which a customer client 104 may initiate an order 147 for the item 124 and receive the benefit of the discount. The offer 131 may also comprise other data.

Next, the merchant client 105 communicates the offer 131 to the customer client 104. This may be facilitated by the pricing application 121 or the electronic commerce system 114 acting as an intermediary between the merchant client 105 or the customer client 104. For example, after generating the offer 131, the electronic commerce system 114 may communicate a notification 127 to the customer client 104 indicating that an offer 131 is available for redemption. As another embodiment, the pricing application 121 may encode the offer 131 as a coupon or promotion code redeemable by the customer client 104. The offer 131 may also be communicated to the customer client 104 by another approach. After receiving the offer 131, the customer client 104 may then initiate through the electronic commerce system 114 an order 147 for the item 124 receiving the benefit of the discount embodied in the offer 131.

Figure 2A:
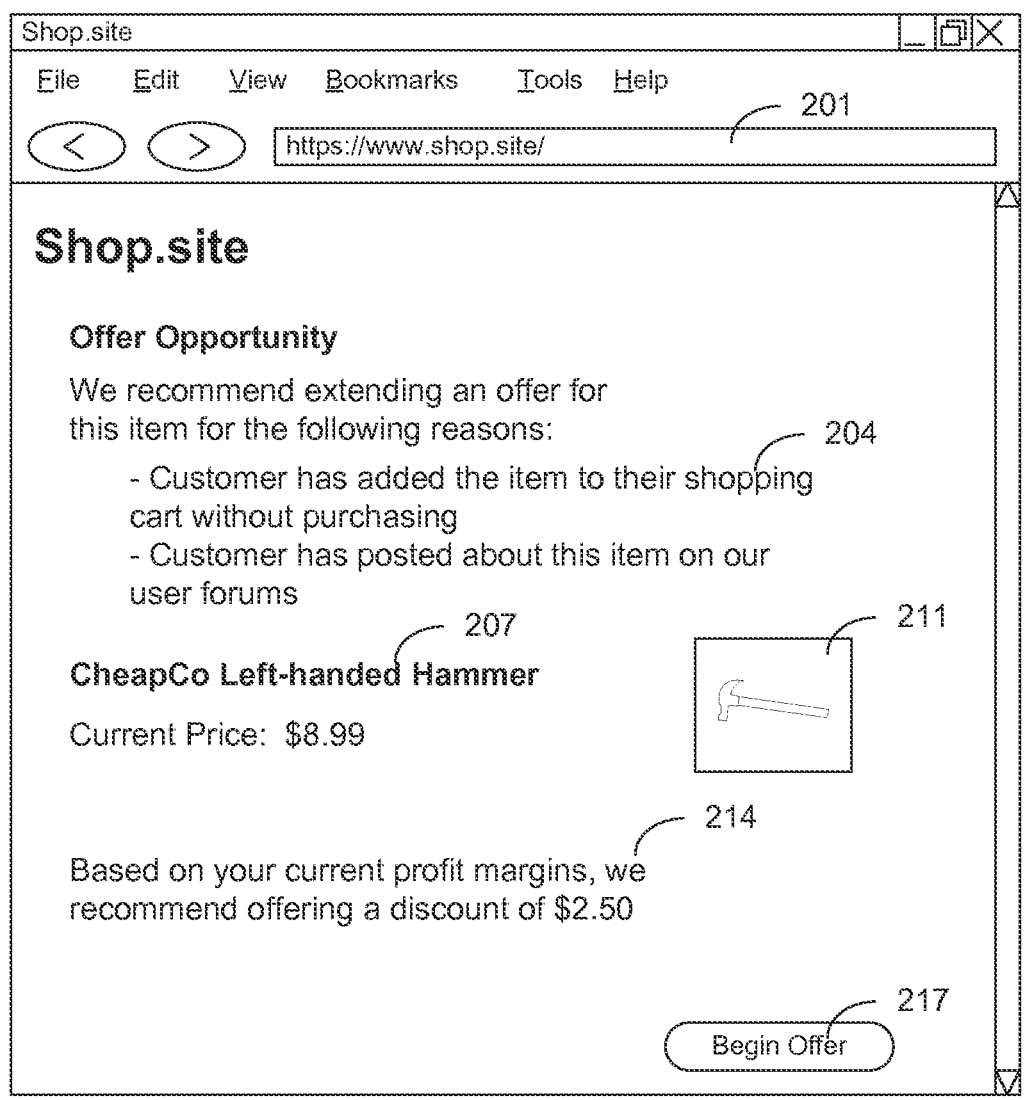
FIGS. 2A and 2B are drawings of example of a user interfaces rendered by a merchant client in the networked environment of FIG. 1 according to various embodiments of the present disclosure.

Referring next to FIG. 2A, shown is an example user interface encoded by the pricing application 121 (FIG. 1) embodying a notification 127 (FIG. 1) communicated to a merchant client 105 (FIG. 1) soliciting an extension of an offer 131 (FIG. 1) for an item 124 (FIG. 1) to a customer client 104 (FIG. 1). The user interface shown in FIG. 2A may be comprise a network page served by a network page server application 117 (FIG. 1) for rendering by a browser client application 154 (FIG. 1). In the alternative, the user interface shown in FIG. 2A may comprise data encoded for rendering by a dedicated client application 154.

Element 201 is a uniform resource locator (URL) directed to content embodying a notification 127 generated by the pricing application 121. Element 204 is a listing of trigger elements satisfied by activities of a customer client 104 with respect to the item 124. Element 207 is a written description of the item 124 for which the offer 131 is solicited. Element 211 is an image which is representative of the item 124. Element 214 is a description of a suggested discount to be included in the generated offer 131 calculated as a function of a profit margin for the item 124. Element 217 is a button which, when clicked, begins the generation of the offer 131 for the item 124.

Figure 2B:
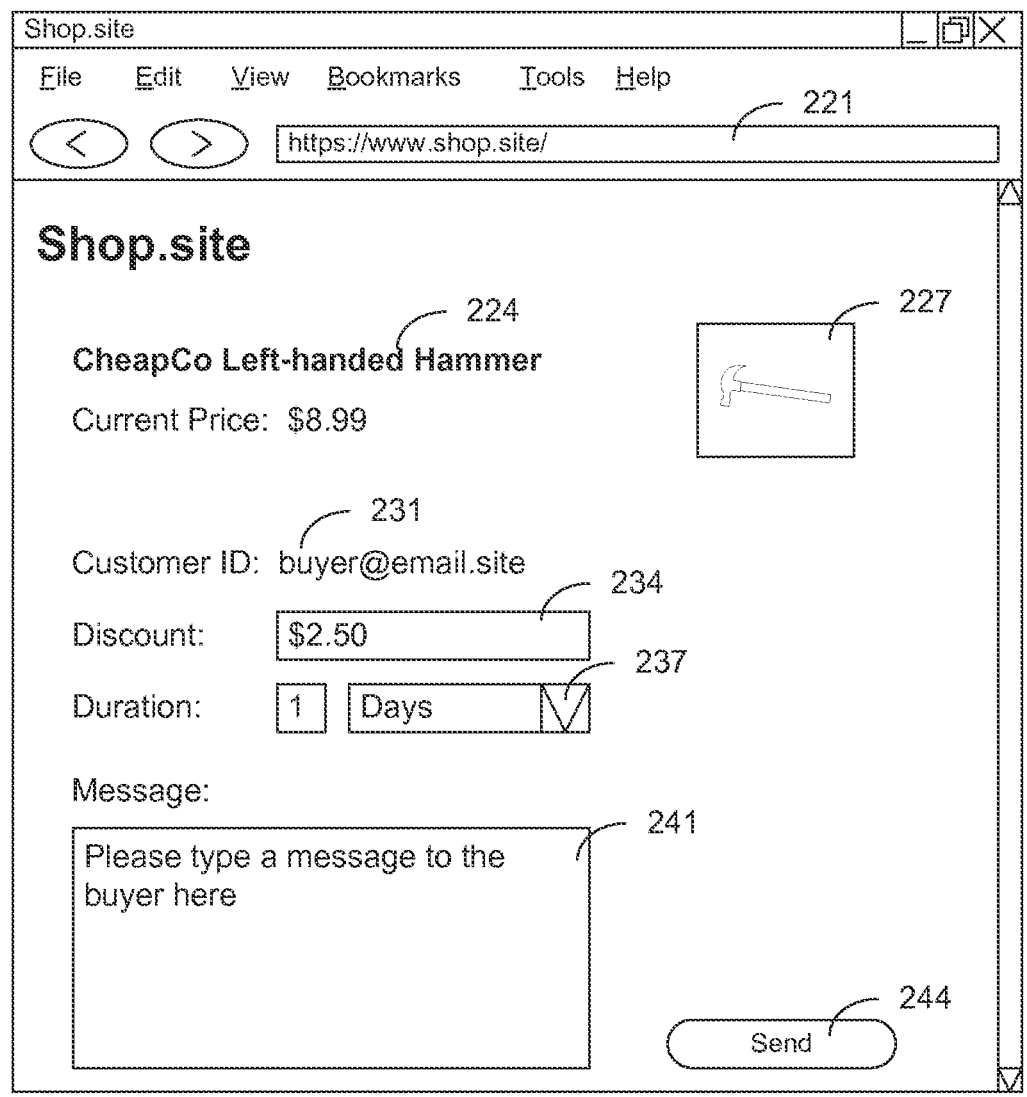

Turning now next to FIG. 2B, shown is an example user interface encoded by the pricing application 121 (FIG. 1) communicated to a merchant client 105 (FIG. 1) to facilitate generating an offer 131 (FIG. 1) for an item 124 (FIG. 1) to be extended to a customer client 104 (FIG. 1). The user interface shown in FIG. 2B may be comprise a network page served by a network page server application 117 (FIG. 1) for rendering by a browser client application 154 (FIG. 1). In the alternative, the user interface shown in FIG. 2A may comprise data encoded for rendering by a dedicated client application 154.

Element 221 is a URL directed to a network site implementing the offer generation functionality of the pricing application 121. Element 224 is a text identifier for the item 124 for which the offer 131 is being generated, including a current price. Element 227 is an image which is representative of the item 124. Element 231 is an identifier directed to the customer client 104 to which the offer 131 will be extended. The identifier may be an email address, a unique identifier automatically generated with respect to the current offer 131 generation session, or another identifier. Element 234 is an input field for a discount component of the offer 131. The input field may be automatically populated with a suggested discount, or populated by input from the merchant client 105.

Element 237 is an input field and drop down menu for a duration component of the offer 131. The input field may comprise an input for a number, while the drop down menu may comprise a drop down for a unit of measurement, such as hours, days, or weeks. Element 241 is an input field into which the merchant client 105 may input a message to the customer client 104 to be included with the offer 131.

Figure 3:
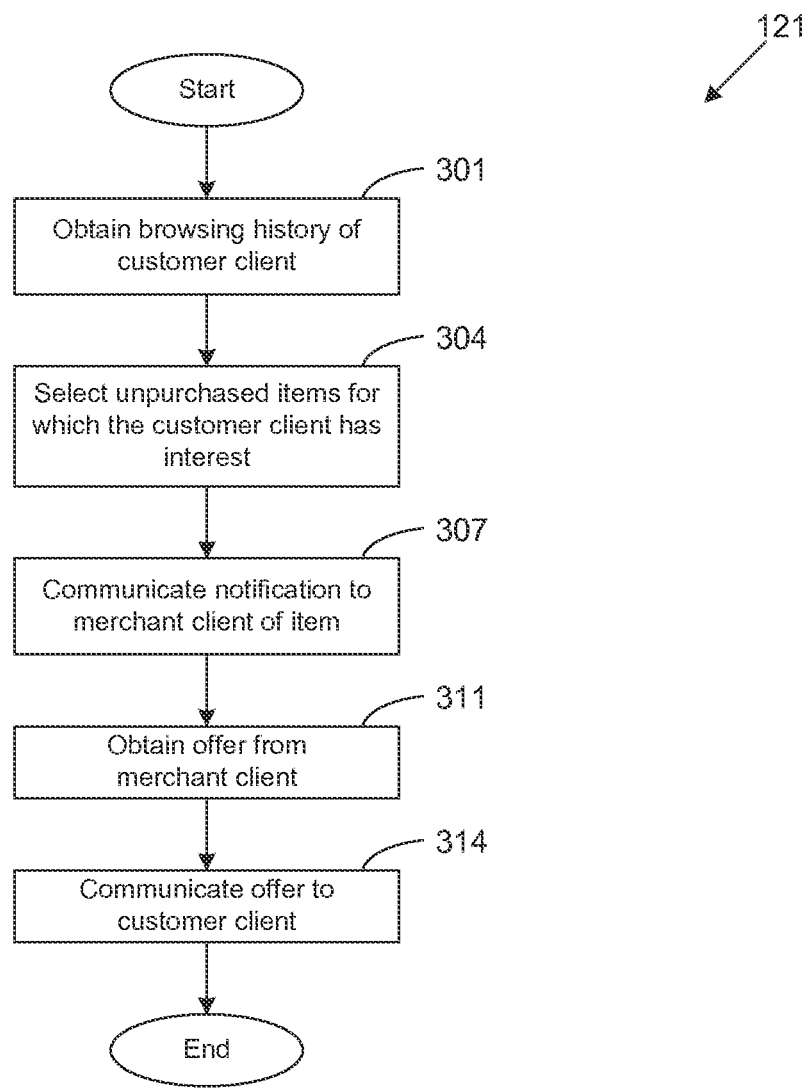
FIG. 3 is a flowchart illustrating one example of functionality implemented as portions of a pricing application executed in a computing environment in the networked environment of FIG. 1 according to various embodiments of the present disclosure.

Moving on to FIG. 3, shown is a flowchart that provides one example of the operation of a portion of the pricing application 121 (FIG. 1) according to various embodiments. It is understood that the flowchart of FIG. 3 provides merely an example of the many different types of functional arrangements that may be employed to implement the operation of the portion of the pricing application 121 as described herein. As an alternative, the flowchart of FIG. 3 may be viewed as depicting an example of steps of a method implemented in the computing environment 101 (FIG. 1) according to one or more embodiments.

Beginning with box 301, the pricing application 121 obtains a browsing history 134 (FIG. 1) of an electronic commerce system 114 (FIG. 1) with respect to a customer client 104. This may comprise loading the browsing history 134 from a data store 111 (FIG. 1). The browsing history 134 may be obtained by another approach. Obtaining the browsing history 134 may be initiated responsive to input from a merchant client 105, such as a call to a web service made available through an API exposed to the merchant client 105, responsive to a passage of a predefined time interval, or responsive to another event.

In box 304, the pricing application 121 selects an item 124 (FIG. 1) from the catalog 151 (FIG. 1) which is unpurchased by a customer client 104 (FIG. 1) in which the customer client 104 has interest as determined by the browsing history 134. Interest in an item 124 may be indicated by a browsing of the item 124 by the customer client 104, an adding of the item 124 to a wish list or shopping cart, a discussion of the item 124 in a message board or forum, or by other criteria.

After selecting the item 124, the pricing application 121 then communicates a notification 127 (FIG. 1) to a merchant client 105 selling the item 124 soliciting an offer 131 (FIG. 1) for the item 124 to be communicated to the customer client 104. The notification 127 may comprise a suggested discount component of the offer 131 generated as a function of a profit margin, revenue goal, average selling price, or other data. The notification 127 may also comprise functionality or data to facilitate the generation of the offer 131 by the merchant client 105. The notification 127 may also comprise other data.

The notification 127 may be communicated by SMS message, email message, push notification, or another communications medium. The notification 127 may also be encoded in a network page served by a network page server application 117 (FIG. 1). The notification 127 may also be communicated by another approach.

In box 311, the pricing application 121 then obtains an offer 131 from the merchant client 105. This may be facilitated by a user interface or other functionality encoded in the notification 127 or served by the network page server application 117. Obtaining the offer 131 may also be facilitated by an API exposed to the merchant client 105 enabling a web service for submitting the offer 131. The offer 131 may also be obtained by another approach.

After obtaining the offer 131 from the merchant client 105, the pricing application 121 then communicates the offer 131 to the customer client 104. This may comprise communicating a notification 127 embodying the offer 131 to the customer client 104. This may also comprise generating and communicating a coupon code or other incentive to the customer client 104 for redemption during a purchase of the item 124. The offer 131 may also be communicated to the customer client 104 by another approach.

Figure 4:
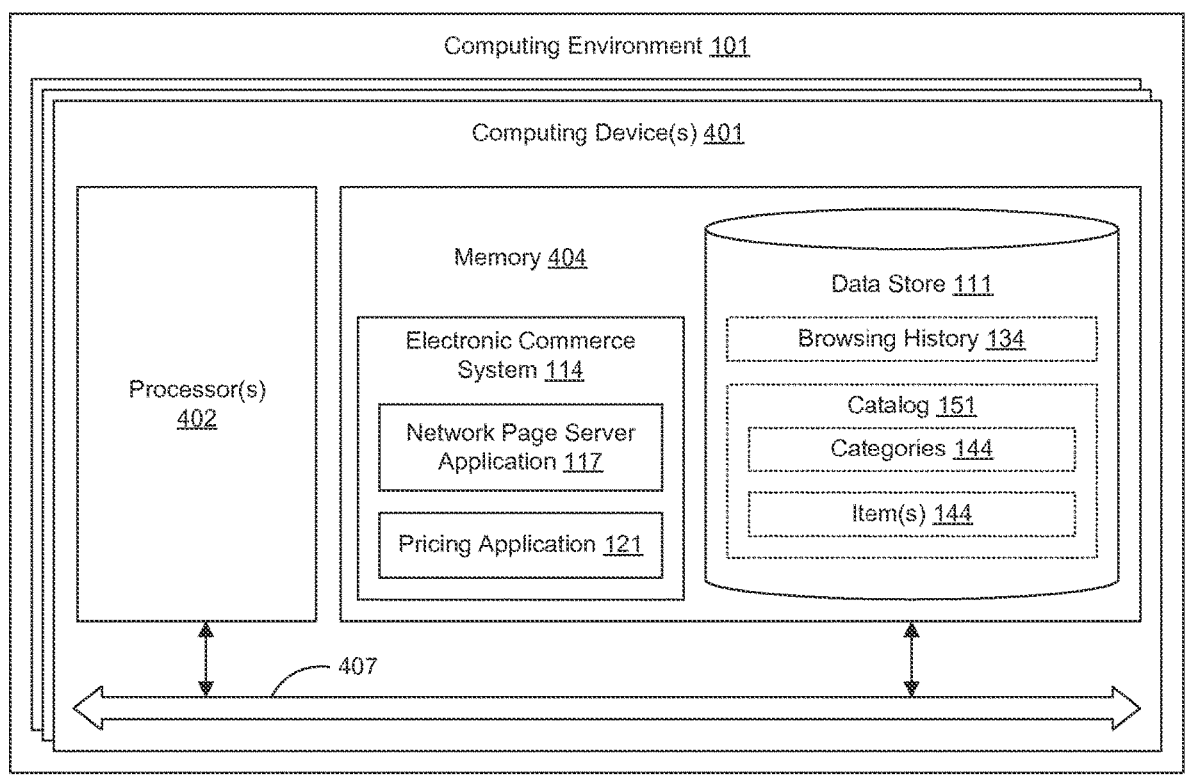
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are an electronic commerce system 114 having a network page server application 117 and a pricing application 121, and potentially other applications. Also stored in the memory 404 may be a data store 111 having a browsing history 134 and a catalog 151 or items 124 organized into categories 144, and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the pricing application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the pricing application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the pricing application 121, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed by at least one computing device, causes the at least one computing device to at least:
   determine a plurality of trigger events associated with a plurality of browsing activities of a user of a client device at an online presence of an electronic commerce system over a computer network, the plurality of browsing activities comprising at least one of: a viewing of an item, a discussion of the item on a forum or message board, and a discussion of the item in a social media service, the item being listed for sale on the electronic commerce system by a merchant device and unpurchased by the user of the client device;
   calculate a score for each of a plurality of items in the electronic commerce system as a function of the plurality of trigger events;
   select at least one of the items responsive to the score of the at least one of the items exceeding a threshold;
   communicate a first notification to the merchant device soliciting a submission of an offer for the at least one of the items, the offer comprising a discount applied to the at least one of the items and a time duration during which the offer is valid;
   obtain the offer from the merchant device;
   communicate a second notification embodying the offer obtained from the merchant device to the client device; and
   wherein the first notification and the second notification comprise a short messaging system (SMS) message, an email message, or content encoded into a network page.

2. The non-transitory computer-readable medium of claim 1, wherein the program further causes the at least one computing device to at least:
   expose to the merchant device an application program interface (API) enabling a plurality of web service calls; and
   wherein the score is calculated responsive to one of the web service calls.

3. The non-transitory computer-readable medium of claim 1, wherein the first notification comprises data encoding another user interface to be rendered to solicit the submission of the offer, the other user interface comprising a list of at least one of the plurality of trigger events.

4. A system, comprising:
   a data store; and
   at least one computing device communicably coupled to the data store, the at least one computing device being configured to at least:
      determine a trigger event corresponding to a browsing activity of a user of a client device at an online presence of an electronic commerce system over a computer network;
      obtain, responsive to the trigger event, an item listed for sale on the electronic commerce system by a merchant device;
      communicate a notification to the merchant device soliciting a submission of an offer to the client device;
      obtain the offer from the merchant device;
      communicate data encoding a user interface to render the offer to the user of the client device; and
      wherein the browsing activity event comprises the item being viewed and unpurchased by the user of the client device within a predefined amount of time after being viewed.

5. The system of claim 4, wherein the offer comprises a discount applied to the item, the offer being redeemable until a predefined deadline.

6. The system of claim 5, wherein the at least one computing device is further configured to at least calculate the discount as a function of a profit margin associated with the item.

7. The system of claim 5, wherein the notification further comprises a suggested discount to be applied to the item.

8. The system of claim 4, wherein the notification comprises an SMS message, an email message, or content encoded into a network page communicated to the merchant device.

9. The system of claim 4, wherein the at least one computing device is further configured to at least:
expose an API defining a plurality of web service calls to the merchant device; and
wherein the notification is encoded in a response to one of the web service calls.

10. The system of claim 9, wherein the one of the web service calls is a first one of the web service calls, and a second one of the web service calls facilitates obtaining the offer.

11. The system of claim 4, wherein the at least one computing device is further configured to at least:
encode for rendering by the merchant device a second user interface to facilitate a generation of the offer; and
communicate the user interface to the merchant device.

12. The system of claim 4, wherein the item is one of a plurality of items, and the item is selected as a function of a merchant device preference.

13. The system of claim 4, wherein the item is one of a plurality of items included in an item category, and the offer comprises a discount applied to the items included in the item category.

14. The system of claim 4, wherein the browsing activity event is one of a plurality of browsing activity events, and the item is selected as a function of a number of occurring trigger events individually corresponding to the plurality of browsing activity events.

15. The system of claim 14, wherein the browsing activity events comprise an addition of the item to a shopping cart or wish list, a viewing of a review of the item, or an encoding of a navigation aid directed to the item facilitated by a social networking service.

16. A method, comprising:
determining, by a computing device, that a number of viewings of an item by a user of a client device exceeds a threshold, the item being unpurchased with respect to the user, the item being listed for sale on an electronic commerce system by a merchant device, the viewings being at an online presence of the electronic commerce system;
selecting, by the computing device, the item from a pool of items associated with the merchant device responsive to determining that the number of viewings of the item exceeds the threshold;
communicating, by the computing device, a first notification to the merchant soliciting a submission of an offer comprising a discount for the item to the client device;
obtaining the offer from the merchant device; and
communicating, by the computing device, a second notification embodying the offer obtained from the merchant device to the client device.

17. The method of claim 16, wherein the first notification facilitates a communication of the offer by the merchant device.

18. The method of claim 16, wherein the discount is valid within a predefined time interval after communicating the second notification.

19. The method of claim 16, wherein the item is unpurchased after an expiration of a predefined duration of time after the viewings.

20. The method of claim 16, further comprising:
maintaining, by the computing device, an API exposing a plurality of web service calls to the merchant device; and
wherein the first notification is communicated responsive to a calling of one of the web service calls.

21. The method of claim 20, wherein the one of the web service calls is a first one of the web service calls, and the method further comprises:
communicating, by the computing device, data embodying at least one conversion rate of the pool of items to the merchant device responsive to a second one of the web service calls; and
obtaining, by the computing device, a selection of the item from the merchant device.

* * * * *